United States Patent [19]

Matsuura

[11] Patent Number: 4,789,873

[45] Date of Patent: Dec. 6, 1988

[54] THERMAL TRANSFER PRINTER

[75] Inventor: Taknobu Matsuura, Takizawa, Japan

[73] Assignee: Alps Electric Co., Ltd., Japan

[21] Appl. No.: 943,603

[22] Filed: Dec. 18, 1986

[30] Foreign Application Priority Data

Feb. 3, 1986 [JP] Japan .............................. 61-14255[U]

[51] Int. Cl.[4] ........................ G01D 15/10; G01D 15/24; B41J 3/20

[52] U.S. Cl. ............................ 346/76 PH; 346/139 B; 400/120; 400/335

[58] Field of Search ............... 346/76 PH, 136, 139 B; 400/120, 335

[56] References Cited

U.S. PATENT DOCUMENTS 4,173,273 11/1979 Hanakata ............................ 400/120

4,517,573 5/1985 Yana ............................... 346/76 PH

*Primary Examiner*—E. A. Goldberg

*Assistant Examiner*—Gerald E. Preston

*Attorney, Agent, or Firm*—Guy W. Shoup; Paul J. Winters

[57] ABSTRACT

A thermal printing head is supported on a member which is independent of a carriage supporting an ink ribbon cassette and which is slidably supported on a shaft extending in parallel to a platen. The carriage is also slidably supported on the shaft. The head supporting member is rotatable about the shaft for moving the head between its printing and non-printing positions. A rack is connected to the head supporting member and is rotatable by a solenoid or like device for rotating the head supporting member about the shaft. A wire extending about a pulley mechanism and along the shaft is fastened at both ends to the head supporting member for moving it and thereby the head along the platen.

5 Claims, 3 Drawing Sheets

THERMAL TRANSFER PRINTER

BACKGROUND OF THE INVENTION

1. Field of the Invention

This invention relates to a thermal transfer printer having a thermal head provided with a plurality of heating elements which are selectively caused to heat ink on an ink ribbon so that the molten ink may be transferred to recording paper to effect desired printing thereon. More particularly, it relates to a mechanism for moving the thermal head.

2. Description of the Prior Art

A known thermal transfer printer is shown in FIGS. 3 and 4. It includes a platen 1 against which recording paper 3 is held by a paper holding roller 2. A cassette 4 containing an ink ribbon 5 has a rectangular opening 6 near the middle portion of its end facing the platen 1. The ink ribbon 5 is exposed through the opening 6. The ink ribbon 5 has one end fastened to a takeup roller 7 and the other end thereof is fastened to a supply roller 8. The takeup roller 7 is secured to a shaft 9 which is driven for rotating the takeup roller 7 when printing is done. A cassette holder 10 is secured to a carriage 11. A positioning pin 12 is provided for positioning the cassette 4 in the cassette holder 10. The carriage 11 is supported on a guide shaft 13 slidably along the platen 1. The carriage 11 is moved by a driving wire 16 fastened at both ends to the carriage 11 and extending about a driving pulley 14 and a driven pulley 15. The driving pulley 14 is connected to an electric motor not shown.

A thermal printing head 18 is disposed in a space defined between the ink ribbon 5 and the opening 6 of the cassette 4. The head 18 has a bottom secured to the carriage 11. The thermal head 18 is normally kept away from the ink ribbon 5 by a spring not shown, as shown in FIG. 4. When printing is required, the head 18 is tilted with the carriage 11 toward the ink ribbon 5 by a solenoid or like device. The ink ribbon 5 has a front surface coated with ink and a rear surface facing the thermal head 18 and not coated with ink. When the head 18 is tilted, it contacts the rear surface of the ink ribbon 5 and thereby brings the front surface of the ink ribbon 5 into contact with the recording paper 3 held on the platen 1. The thermal head 18 is provided with a plurality of heating elements which are selectively caused to heat the ink in accordance with a predetermined printing pattern.

The platen 1 is intermittently rotated as shown by an arrow in FIG. 4 to move the paper 3 after each horizontal line of printing has been made. When no printing is done, the thermal head 18 is kept away from the platen 1.

When one uses any such thermal transfer printer, it is important to avoid any waste of the ink ribbon, as it is expensive. Therefore, it is essential to see that the ink ribbon should not be moved as long as the thermal head is away from the platen or in its up position, but should be moved only when it has been pressed against the platen or is in its down position. See, for example, Japanese Patent Publication No. 21471/1982.

Thus, the thermal head is moved repeatedly between its up and down positions. In the known printer, the carriage is moved for moving the thermal head between its up and down positions, as hereinabove described. Therefore, a large force is required for moving the thermal head and a large solenoid or like device is necessarily required. The known printer is, therefore, undesirably large and expensive.

The use of the carriage for moving the thermal head between its up and down positions presents another problem, too. In order to ensure that the thermal head be pressed against the platen when it is in its down position, it is necessary to position the head so that it may project from the end of the ink ribbon cassette facing the platen. The head so positioned makes it difficult to fit the cassette in position.

Another printer known in the art is shown in FIG. 5. It aims at overcoming the drawbacks or disadvantages of the printer as hereinabove described. It is characterized by employing a thermal head supporting member 20 which is independent of a carriage and which is tilted for moving the thermal head between its up and down positions. A driving wire (or belt) is usually fastened to the carriage for moving it and thereby the thermal head along the platen. This printer has, however, a serious drawback. The displacement of the thermal head supporting member 20 relative to the carriage is unavoidable, insofar as they are independent of each other. Its displacement gives rise to vibration and thereby results in printing in a wrong place or line. Therefore, only a print of poor quality can be produced.

SUMMARY OF THE INVENTION

Under these circumstances, it is an object of this invention to provide an improved thermal transfer printer having a thermal head which requires only a small force for movement between its printing and non-printing positions, and which can also be moved reliably along a platen for achieving a satisfactory printing operation.

This object is attained by a printer which includes a thermal head supporting member which is independent of a carriage supporting an ink ribbon cassette, the thermal head supporting member and the carriage being supported slidably on a shaft extending in parallel to a platen, and a member connected to the thermal head supporting member for moving it along the platen to move the carriage, too, in the same direction.

According to this invention, it is sufficient to move the thermal head supporting member to and away from the platen to move the thermal head between its down or printing position and its up or non-printing position. Therefore, only a smaller force is required for moving the thermal head than is required for moving the thermal head in any apparatus typically known in the art. It is sufficient to use a smaller solenoid or like device. The printer as a whole is more compact in construction and less expensive.

The member for moving the thermal head along the platen is connected directly to the thermal head supporting member. Therefore, the thermal head does not cause any displacement or vibration, but can be reliably moved and positioned along the platen to ensure printing of good quality.

BRIEF DESCRIPTION OF THE DRAWINGS

FIG. 2(*b*) is a view similar to FIG. 2(*a*), but showing the thermal head in its down position;

DETAILED DESCRIPTION OF THE INVENTION

Figure 1:
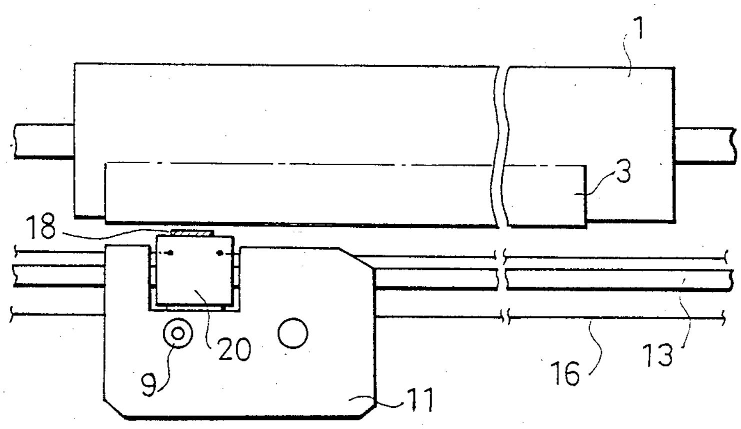
FIG. 1 is a partly omitted top plan view of a printer embodying this invention.
Figure 3:
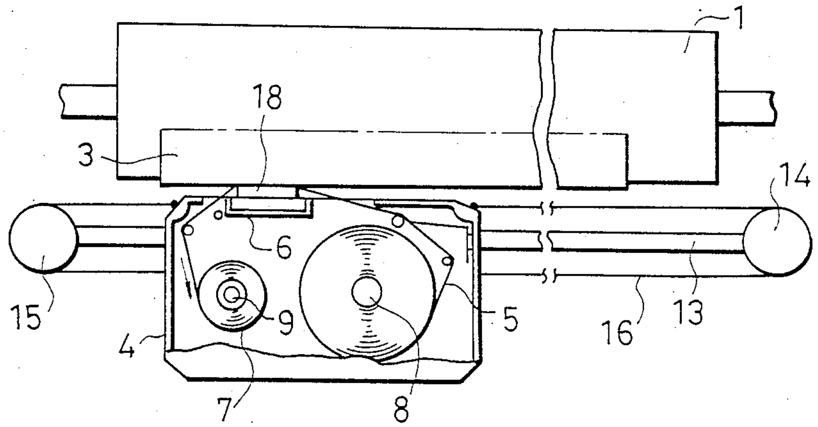
Fig. 3 PRIOR ART
FIG. 3 is a partly omitted top plan view of a known printer.
Figure 4:
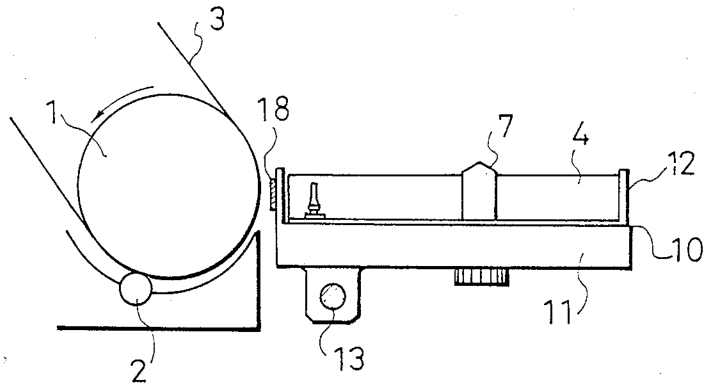
Fig. 4 PRIOR ART
FIG. 4 is a side elevational view of the printer shown in FIG. 3.
Figure 5:
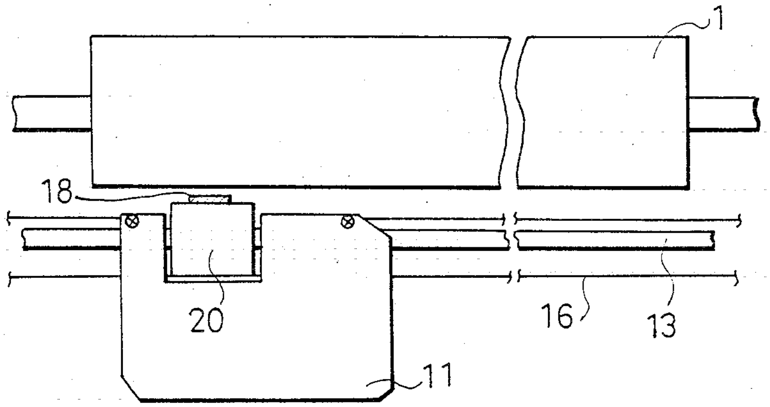
Fig. 5 PRIOR ART
FIG. 5 is a partly omitted top plan view of another known printer.

A thermal transfer printer embodying this invention will now be described with reference to FIGS. 1, 2(*a*) and 2(*b*). The following description is substantially directed only to those aspects of this invention which differ from the prior art. For details of any other aspect, reference is made to the foregoing description of the prior art and FIGS. 3 to 5.

The printer of this invention includes a thermal head supporting member 20 which is independent of a carriage 11. The thermal head supporting member 20 is slidably supported on a shaft 13 extending in parallel to a platen 1. The carriage is also slidably supported on the shaft 13. A driving wire 16 extending about two pulleys not shown is fastened at both ends to the thermal head supporting member 20. The wire 16 is movable along the platen 1 by a mechanism not shown, but as already described with reference to the prior art, to move the thermal head supporting member 20 along the platen 1. The carriage 11 is so related in position to the thermal head supporting member 20 that if the latter is moved along the platen 1, the former is also moved in the sam direction.

Figure 2A:
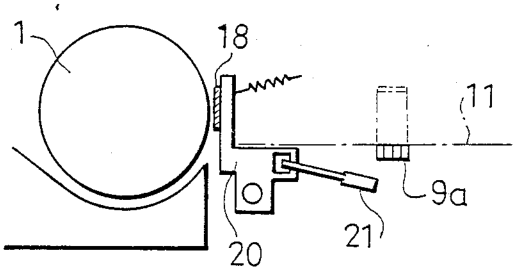
FIG. 2(*a*) is a side elevational view of the printer showing a thermal head in its up position.
Figure 2B:
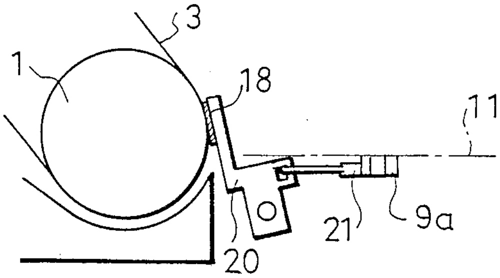

A rack 21 extends along the platen 1 and is engaged with the thermal head supporting member 20, as shown in FIGS. 2(*a*) and 2(*b*). The rack 21 is rotatable by a solenoid or like device not shown to rotate the thermal head supporting member 20 and thereby move a thermal head 18 between its up and down positions. A shaft 9 on which a takeup roller for an ink ribbon is supported is formed at its lower end with a gear 9*a*. The teeth of the rack 21, which are not shown, are engageable with the gear 9*a* only when the thermal head 18 is in its down position, so that the ink ribbon may be moved only when printing is done, as shown in FIG. 2(*b*).

What is claimed is:

1. In a printer of the type in which a thermal printing head carrying a pluarlity of heating elements is movable between its printing position in which it brings an ink ribbon into contact with paper on a platen and melts ink on said ribbon to transfer the molten ink onto said paper in accordance with a specific printing pattern and its non-printing position in which said printing head is retracted away from said ink ribbon and the paper, said head being also movable along said platen with a carriage supporting a cassette containing said ribbon, the improvement which comprises:

- a head supporting member supporting said head and supported slidably on a shaft which extends in parallel to said platen;
- said carriage being also slidably supported on said shaft for parallel movement in tandem with said head supporting member along said platen;
- said head supporting member being rotatable about said shaft for moving said head between said printing and non-printing positions, said head supporting member being rotatable about and slidably supported on said shaft independently of said carriage;
- head rotating means connected to said head supporting member for rotating it about said shaft; and
- driving means associated with a pulley mechanism and a motor, extending along said shaft and directly fastened to said head supporting member for directly driving said head supporting member and thereby said head in tandem with said carriage along said platen.

2. A printer as set forth in claim 1, wherein said rotating means comprises a rack extending along said platen and connected to said supporting member and a device for rotating said rack to rotate said supporting member.

3. In a printer of the type in which a thermal printing head carrying a plurality of heating elements is movable between its printing position in which it brings an ink ribbon into contact with paper on a platen and melts ink on said ribbon to transfer the molten ink onto said paper in accordance with a specific printing pattern and its non-printing position in which said printing head is retracted away from said ink ribbon and the paper, said head being also movable along said platen with a carriage supporting a cassette containing said ribbon, the improvement which comprises:

- a head supporting member supporting said head and supported slidably on a shaft which extends in parallel to said platen;
- said carriage being also slidably supported on said shaft for parallel movement in tandem with said head supporting member along said platen;
- said head supporting member being rotatable about said shaft for moving said head between said printing and non-printing positions, said head supporting member being rotatable about and slidably supported on said shaft independently of said carriage;
- head rotating means connected to said head supporting member for rotating it about said shaft, wherein said head rotating means comprises a rack extending along said platen and connected to said head supporting member and device for rotating said rack to rotate said head supporting member; and
- driving means associated with a pulley mechanism and a motor extending along said shaft and directly fastened to said head supporting member, wherein said driving means comprising a wire extending about said pulley mechanism and having a pair of ends fastened to said head supporting member for directly driving said head supporting member and thereby said head in tandem with said carriage along said platen.

4. A printer as set forth in claim 2, wherein a shaft on which a roller is rotatably supported for taking up said ribbon in said cassette is formed with a gear with which said rack is engageable to rotate said roller only when said head is in said printing position.

5. A printer as set forth in claim 3, wherein a shaft on which a roller is rotatably supported for taking up said ribbon in said cassette is formed with a gear with which said rack is engageable to rotate said roller only when said head is in said printing position.

* * * * *